June 27, 1967  E. A. MUIJDERMAN  3,328,094
AXIAL BEARINGS OF THE PUMP TYPE
Filed Jan. 21, 1965

INVENTOR.
EVERHARDUS A. MUIJDERMAN
BY
AGENT

United States Patent Office 3,328,094
Patented June 27, 1967

3,328,094
AXIAL BEARINGS OF THE PUMP TYPE
Everhardus Albertus Muijderman, Emmasingel, Eindhoven, Netherlands, assignor to North American Philips Company, Inc., New York, N.Y., a corporation of Delaware
Filed Jan. 21, 1965, Ser. No. 427,048
Claims priority, application Netherlands, Feb. 29, 1964, 6,402,052
3 Claims. (Cl. 308—9)

The invention relates to an axial bearing for a shaft adapted to rotate in a medium of the general type disclosed in S.N. 282,770 filed May 23, 1963, now U.S. Patent No. 3,207,563. Such a bearing comprises a stationary supporting member and a rotatable pressure member co-operating with said supporting member in operation. The two relatively cooperating surfaces have a rotational-symmetrical shape, one of the members being provided over at least part of its surface with regularly distributed, uninterrupted, identical, shallow grooves, the centre line of each groove having the shape of a helix which has a course such that, in operation, the helix forces the medium from the outer or peripheral side of the bearing towards the shaft. The shaft of the rotatable pressure member passes with clearance (radial) through the support.

It is known to provide the supporting member with a seal. Owing to the pumping effect of the helical grooves a high pressure is produced between the bearing faces, which results in a high supporting power of the bearing. In practice, however, leakage of the medium in the known seal cannot be avoided. Moreover, between the shaft and the known seal undesirable friction is produced so that wear of the seal is involved, and in low power applications this friction is relatively great.

It is also known to provide no seal between the supporting member and the portion of the shaft passed through said member. Since the shaft is capable of swinging slightly, but contact between the supporting member and the shaft is to be avoided, ample clearance must be provided between the shaft and the supporting member. Consequently, a considerable stream of medium will flow between the shaft and the supporting member, resulting in a significant loss of the medium pressure between the bearing faces and hence the supporting power of the bearing is considerably reduced.

The invention has for its object to provide a practical and reliable structure of a sealed bearing of the abovementioned type, in which the quantity of leakage is restricted, so that maximum supporting power is obtained, while friction between the shaft and the supporting member or seal is avoided. To this end, in accordance with the invention, the shaft portion passing through the supporting member projects through an annular body, the inner diameter of which is only slightly larger than the diameter of said shaft portion. This annular body is arranged with ample clearance, at least in a radial direction, in a chamber provided in the supporting member, and a seal is placed between the annular body and the supporting member, such that movement of the annular body is allowed in a radial direction. The gap or space between the shaft and the annular body has a small predeterminable size, which remains constant in operation so that leakage is slight and the supporting power is favorably affected. Since the shaft and the cylindrical portion of the annular body do not contact while the shaft is rotating and swinging slightly, the friction and wear between said parts is avoided since in the swinging movement, the annular body moves with the shaft in the chamber of the support.

In an advantageous embodiment of the bearing according to the invention the annular body consists of a cylindrical portion, the inner surface of which forms a narrow gap with the surface of the shaft, and a radial flange portion connected with the cylindrical portion and projecting into a recess providing a chamber in the supporting member. The seal is arranged between the surfaces of the flange and the surface of the recess remote from the bearing faces, and lying in a plane at right angles to the shaft, whereby the pressure of the medium produced in the bearing urges the flange into intimate pressed relation with the seal. That is, the narrow gap between the shaft and the ring ensures only slight leakage and hence a high supporting power of the bearing; therefore the seal between the flange and the supporting member is maintained by the pressure of the medium without requiring the use of springs or such mechanical pressing means.

The invention will be described more fully with reference to an embodiment shown in the drawing.

Figure 1:
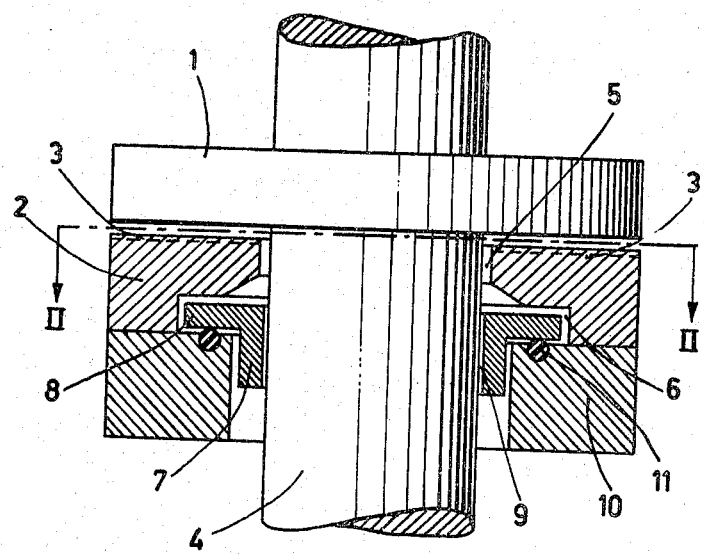
FIG. 1 is a sectional view of a bearing according to the presently preferred embodiment of the invention.
Figure 2:
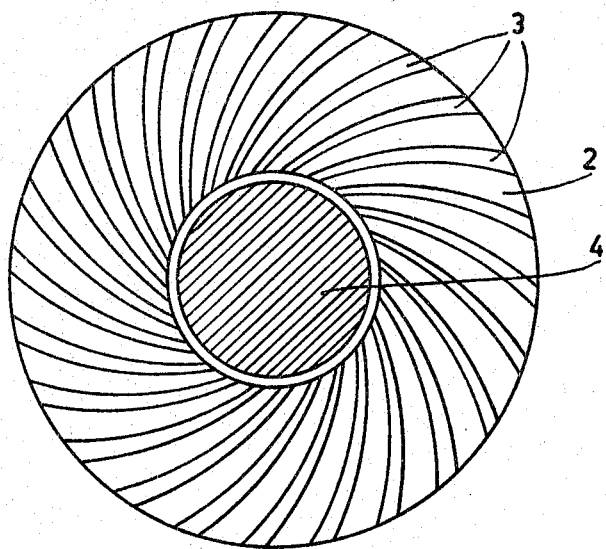
FIG. 2 is an elevation taken on the line II—II in FIG. 1.

The bearing shown in the drawing consists of a rotational pressure member 1 and a supporting member 2, cooperating with the former member. The supporting member 2 is provided with regularly distributed, identical grooves 3. The grooves are very shallow; between 10 and 100μ with normal bearing size. The centre line of each groove has the shape of a helix which has a course such that upon rotation of the shaft 4 and hence of the pressure member 1 the medium is urged from the outer side of the bearing towards the shaft 4. Owing to this pushing effect a pressure is produced in the medium between the relatively cooperating bearing faces. The medium subjected to the pressure will flow through a wide gap between the supporting member 2 and the shaft 4 into a chamber 6, provided in the supporting member 2. This chamber 6 accommodates an annular body comprising a cylindrical portion 7, which forms with the shaft 4 an elongated gap 9, and a flange 8, which is held in a recess provided in the chamber 6. Between the flange 8 and an annulus 10 of the supporting member 2 there is provided a ring seal 11. The annular body is ensured against rotation by means (not shown).

Owing to the pressure of the medium, for example oil or air, the flange 8 of the annular body 7, 8 is urged against the seal 11, so that leakage past the ring seal is avoided. Between the inner side of the cylindrical portion 7 and the shaft 4 there is formed a narrow elongated gap, 9, the dimensions of which have been accurately determined and depend upon the diameter of the shaft and the inner diameter of the cylinder 7. The medium will leak through this gap 9, however the gap 9 has a small size, so that leakage is restricted. The bearing has a supporting power which is less, than that of a bearing without leakage, but it is considerably greater than that of known bearings which exhibit a great clearance between the shaft and the supporting member.

The shaft 4 and the annular body 7, 8, upon rotation of the shaft, are operative as a radial bearing and when the shaft swings, the annular body which is capable of moving relative to the support means 2, 10 will move concentrically with the shaft 4, so that no friction between the shaft and the cylindrical portion 7 will occur. The size of the gap 9 remains constant and with a constant speed of the shaft the supporting power of the bearing will not vary.

The adjustability of the body 7, 8 in a radial direction, in conjunction with the possibility of completely sealing the opening between the flange 8 and the supporting member 2, permits provision of a very small gap 9, so that leakage of medium is slight and the supporting power of the bearing is high, and additionally no frictional losses will occur between the shaft and the supporting member.

It will be obvious that the cooperating surfaces of the pressure member 1 and the supporting member 2 may have a shape differing from that shown; they may for example form part of a sphere. The grooves 3 may be provided, with the same effect, in the pressure member 1 instead of being provided in the supporting member 2. It is not necessary for the annular body 7, 8 to have the shape shown in FIG. 1; it must only be constructed so that a small gap 9 can be formed and that a good seal with the supporting member 2 can be made.

What is claimed is:

1. A fluid lubricated axial bearing comprising a rotatable pressure member; a shaft integral with and concentric to said pressure member; support means concentric with said shaft and having a face in confronting relation to a face on said pressure member, said confronting faces providing bearing surfaces when pressurized lubricant is passed therebetween; and a seal assembly comprising an annular body in narrowly gapped spaced relation with said shaft and located in a groove on the internal diametral surface of said support means and radially movable therein, and a ring seal positioned between the face of said annular body remote from said confronting faces and a sidewall of said groove, which is adapted to sealingly engage said annular body and said sidewall when said pressurized fluid acts on said annular body face opposite said sealing face.

2. A fluid lubricated axial bearing according to claim 1 wherein said narrow gap between said annular body and said shaft provides a limited passage for said pressurized lubricant thereby providing a low friction bearing connection between said annular body and said shaft.

3. A fluid lubricated axial bearing according to claim 2 wherein said annular body comprises a cylindrical portion and a radially flanged portion, said flanged portion engaging said ring seal; and with said groove having a shape complementary to said annular body wherein said sealing engagement will be maintained during radial movement of said shaft and said annular body.

References Cited
UNITED STATES PATENTS

| | | | |
|---|---|---|---|
| 2,015,233 | 5/1937 | Pfleger | 277—174 |
| 2,951,729 | 9/1960 | Skarstrom | 308—9 |
| 3,058,785 | 10/1962 | Steele | 308—9 |

MARTIN P. SCHWADRON, *Primary Examiner.*

FRANK SUSKO, *Examiner.*